(12) United States Patent
Li et al.

(10) Patent No.: US 9,756,301 B2
(45) Date of Patent: Sep. 5, 2017

(54) WEARABLE PROJECTION EQUIPMENT

(71) Applicant: BOE TECHNOLOGY GROUP CO., LTD., Beijing (CN)

(72) Inventors: Yaohui Li, Beijing (CN); Yanshun Chen, Beijing (CN); Qiushi Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 65 days.

(21) Appl. No.: 14/655,163

(22) PCT Filed: Apr. 21, 2015

(86) PCT No.: PCT/CN2015/077037
§ 371 (c)(1),
(2) Date: Jun. 24, 2015

(87) PCT Pub. No.: WO2015/165339
PCT Pub. Date: Nov. 5, 2015

(65) Prior Publication Data
US 2016/0261834 A1    Sep. 8, 2016

(30) Foreign Application Priority Data

Apr. 28, 2014  (CN) ..................... 2014 2 0212879 U

(51) Int. Cl.
*H04N 5/64* (2006.01)
*H04N 9/31* (2006.01)
(Continued)

(52) U.S. Cl.
CPC .......... *H04N 9/3173* (2013.01); *G06F 1/163* (2013.01); *G06F 3/03545* (2013.01); *G06F 3/042* (2013.01); *G06F 3/0426* (2013.01)

(58) Field of Classification Search
CPC ..... H04N 9/3173; G06F 3/01; G06F 3/03545; G06F 3/042; G06F 1/163; G06F 3/0426
(Continued)

(56) References Cited

U.S. PATENT DOCUMENTS

2009/0295712 A1\* 12/2009 Ritzau ................... G06F 1/1626
345/156
2010/0199232 A1   8/2010 Mistry et al.
(Continued)

FOREIGN PATENT DOCUMENTS

CN      204048340 U    12/2014
CN      104461004 A    3/2015
(Continued)

OTHER PUBLICATIONS

International Search Report of PCT/CN2015/077037 in Chinese, mailed Jul. 17, 2015 with English translation.
(Continued)

*Primary Examiner* — Michael Lee
(74) *Attorney, Agent, or Firm* — Collard & Roe, P.C.

(57) ABSTRACT

Embodiments of the present disclosure provide a wearable projection equipment, comprising a first structure body and a second structure body which are movably connected to each other, and the first structure body can rotate relative to the second structure body; and a projection device is respectively provided on the first structure and the second structure. The wearable projection equipment is capable of projecting images in different directions respectively, such that application scenarios of the wearable projection equipment become more extensive.

9 Claims, 2 Drawing Sheets

(51) Int. Cl.
    *G06F 3/0354*     (2013.01)
    *G06F 3/042*      (2006.01)
    *G06F 1/16*       (2006.01)
(58) Field of Classification Search
    USPC ........................................................ 348/789
    See application file for complete search history.

(56)                References Cited

U.S. PATENT DOCUMENTS

2011/0007035 A1*   1/2011   Shai ..................... G06F 3/014
                                                          345/179
2012/0090356 A1*   4/2012   Liberman .............. A44C 9/003
                                                             63/3
2012/0249409 A1    10/2012  Toney et al.

FOREIGN PATENT DOCUMENTS

KR     10-2010-0072198 A    6/2010
WO        2012/131584 A2   10/2012

OTHER PUBLICATIONS

Notice of Transmittal of the International Search Report of PCT/CN2015/077037 in Chinese, mailed Jul. 17, 2015.
Written Opinion of the International Searching Authority of PCT/CN2015/077037 in Chinese, mailed Jul. 17, 2015 with English translation.
Korean Office Action in Korean Application No. 10-2015-7019292, mailed Sep. 26, 2016 with English translation.
Korean Office Action in Korean Application No. 10-2015-7019292, mailed Apr. 20, 2017 with English translation.

* cited by examiner

WEARABLE PROJECTION EQUIPMENT

CROSS REFERENCE TO RELATED APPLICATIONS

This application is the National Stage of PCT/CN2015/077037 filed on Apr. 21, 2015, which claims priority under 35 U.S.C. §119 of Chinese Application No. 201420212879.1 filed on Apr. 28, 2014, the disclosure of which is incorporated by reference.

TECHNICAL FIELD

Embodiments of the present disclosure relate to a wearable projection equipment.

BACKGROUND

Today's people have become increasingly inseparable from technologies, as smart phones, notebooks, and tablets have permeated all aspects of life, and technological products trend towards miniaturization and intelligentization. A wearable technological product refers to an equipment which integrates some functions of traditional equipments into traditional wearable items, it can liberate people's limbs to achieve closer combination between human body and machines. A technical solution is proposed to integrate the projection equipment into glasses, however, the projection direction of the current projection glasses is fixed, so that application of projection glasses is simple.

SUMMARY

At least one embodiment of the present disclosure provides a wearable projection equipment, comprising:

a first structure body and a second structure body which are movably connected to each other, and the first structure body capable of rotating relative to the second structure body; and a projection device is respectively provided on the first structure body and the second structure body.

In one embodiment according to the present disclosure, the first structure body is a first ring-shaped body, and the second structure body is a second ring-shaped body.

In one embodiment according to the present disclosure, the wearable projection equipment is a projection ring.

In one embodiment according to the present disclosure, an end opening of the first ring-shaped body and an end opening of the second ring-shaped body are connected to each other in a manner of telescope.

In one embodiment according to the present disclosure, tooth-shaped structures meshing with each other are respectively provided at the two end openings where the first ring-shaped body and second ring-shaped body are connected to each other.

In one embodiment according to the present disclosure, an electrode is provided at the tooth tip of the tooth-shaped structure of the first ring-shaped body; and an electrode is provided at the tooth root of the tooth-shaped structure of the second ring-shaped body.

In one embodiment according to the present disclosure, in the case of the tooth-shaped structure of the first ring-shaped body and the tooth-shaped structure of the second ring-shaped body meshing with each other, the electrode provided at the tooth tip of the tooth-shaped structure of the first ring-shaped body and the electrode provided at the tooth root of the tooth-shaped structure of the second ring-shaped body are electrically connected to each other.

In one embodiment according to the present disclosure, the above wearable projection equipment further comprises: a touch detection module, capable of detecting a touch action of a finger or a touch pen on an object as a projection screen.

In one embodiment according to the present disclosure, the touch detection module comprises a laser generator and a laser detector, wherein the laser generator generates a laser projected on a surface of the object as the projection screen, and when a finger or a touch pen performs a pressing-key operation on the surface of the object as the projection screen having a keyboard pattern, the laser will form a spot on the finger or the touch pen, and the laser detector detects a mapping position on the keyboard pattern corresponding to the spot on the finger or the touch pen.

In one embodiment according to the present disclosure, the touch detection module is provided on at least one of the first structure body and the second structure body.

In one embodiment according to the present disclosure, the touch detection module comprises a laser generator and a laser detector, wherein the laser generator is configured to generate a laser projected on a surface of the object as the projection screen, and the laser detector is configured to determine a touch position of a finger or a touch pen through a spot formed by the laser on the finger or the touch pen performing an operation on the projection screen.

In one embodiment according to the present disclosure, the above wearable projection equipment further comprises:

a wireless module which is electrically connected to projection devices on the first ring-shaped body and second ring-shaped body respectively, and is used to achieve the communication and/or electrical connection between the projection device and other equipments through a wireless technology.

The wearable projection equipment according to embodiments of the present disclosure is capable of projecting images in different directions by providing the projection device respectively on the two rotatable structures, such that application scenarios of the wearable projection equipment become more extensive, thereby making it more convenient to use.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Figure 1:
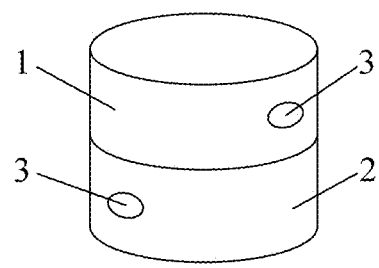
FIG. 1 is a schematic structural diagram of a wearable projection equipment according to one embodiment of the present disclosure.

As illustrated in FIG. 1, an embodiment of the present disclosure provides a wearable projection equipment comprising a first structure body 1 and a second structure body 2 which are movably connected to each other and can rotate relative to each other; and a projection device 3 is respectively provided on the first structure body 1 and the second structure body 2.

Figure 2:
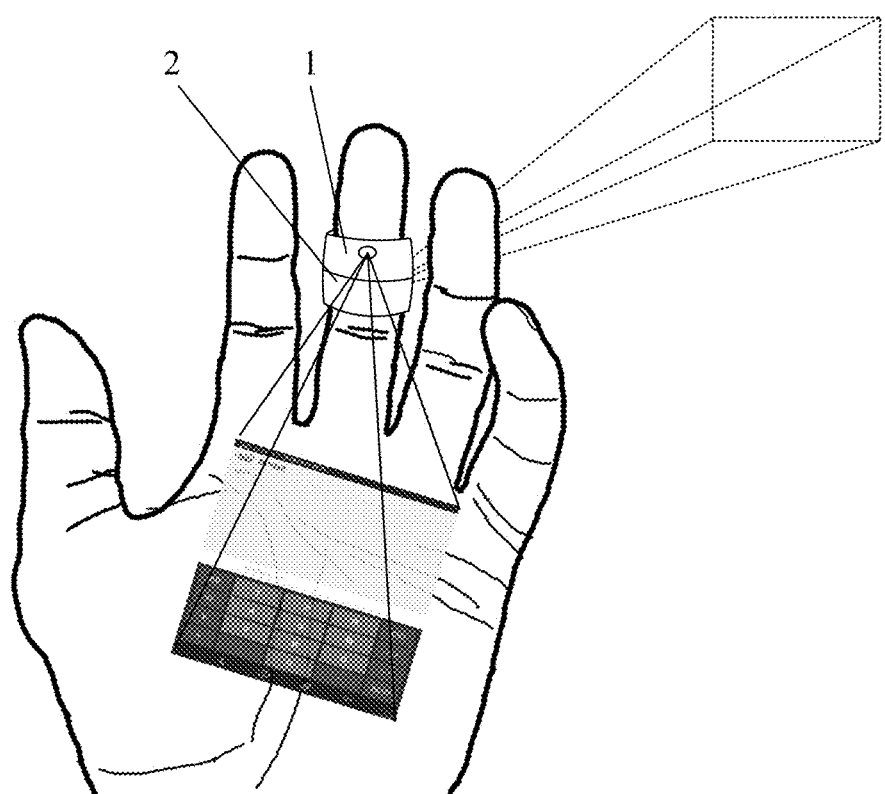
FIG. 2 is a schematic diagram of the wearable projection equipment in FIG. 1 when being worn on the finger.

For example, when both the first structure body 1 and the second structure body 2 are ring-shaped bodies, the two ring-shaped bodies have approximately the same central axis, so that the first structure body 1 and second structure body 2 can rotate relative to each other around the above central axis. The above wearable projection equipment can be a projection ring which can be applied to a variety of application scenarios. For example, as illustrated in FIGS. 1 and 2, the projection ring is worn on a finger, and the first structure body 1 and the second structure body 2 are rotated, so as to make one projection device 3 towards the palm of the wearer and another projection device 3 towards a wall or a desktop located in the direction of the back of the hand of the wearer. The two projection devices 3 can project the same or different images, for example, the image projected on the palm of the wearer is a annotated slide to facilitate the wearer to explain; whereas the image projected on the wall is a non-annotated slide whose content are more intuitive and easy for other people to watch. Alternatively, the two projection devices on the first structure body and the second structure body can be adjusted to the same direction, wherein one of the projection devices projects the image towards the desktop and the other of the projection devices projects the image towards the wall.

The wearable projection equipment according to embodiments of the present disclosure is capable of projecting images in different directions by providing the projection device respectively on the two structures body rotatable relative to each other, such that application scenarios of the wearable projection equipment become more extensive, thereby making it more convenient to use.

Figure 3:
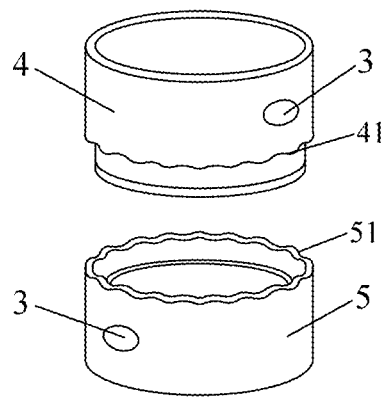
FIG. 3 is a schematic exploded diagram of the wearable projection equipment according to another embodiment of the present disclosure.

For example, as illustrated in FIG. 3, the first structure body is a first ring-shaped body 4, and the second structure body is a second ring-shaped body 5.

For example, the wearable projection equipment is a projection ring.

For example, an end opening of the first ring-shaped body 4 and an end opening of the second ring-shaped body 5 are connected to each other in a telescope manner.

According to one embodiment of the present disclosure, tooth-shaped structures meshing with each other are respectively provided at the two end openings where the first ring-shaped body 4 and the second ring-shaped body 5 are connected to each other. As an example, as depicted in FIG. 3, a tooth-shaped structure 41 is provided at the lower end of the first ring-shaped body 4, and a tooth-shaped structure 51 is provided at the upper end of the second ring-shaped body 5. After the adjustment of the relative position relationship between the first ring-shaped body 4 and the second ring-shaped body 5 is completed, tooth-shaped structures meshing with each other can ensure that the first ring-shaped body 4 and the second ring-shaped body 5 no longer rotate, so as to improve the stability of the projection.

According to one embodiment of the present disclosure, an electrode is provided at the tooth tip of the tooth-shaped structure of the first ring-shaped body 4, and an electrode is provided at the tooth root of the tooth-shaped structure of the second ring-shaped body 5. No matter how to rotate the first ring-shaped body 4 and the second ring-shaped body 5, in the stationary state after the completion of the rotation, the tooth tip of the tooth-shaped structure of the first ring-shaped body 4 and the tooth root of the tooth-shaped structure of the second ring-shaped body 5 always have the same corresponding position relationship, therefore this can ensure different contacts on the two electrodes correspond to each other properly, so as to achieve the electrical connection between electronic components in the first ring-shaped body 4 and electronic components in the second ring-shaped body 5.

Figure 4:
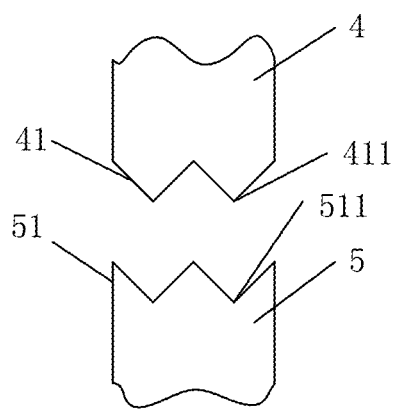
FIG. 4 is a partially enlarged schematic diagram of the wearable projection equipment according to an embodiment of the present disclosure.

FIG. 4 is a partially enlarged schematic diagram of the first ring-shaped body 4 and the second ring-shaped body 5. It is illustrated in FIG. 4 that the electrode 411 is provided at the tooth tip of the tooth-shaped structure 41 of the first ring-shaped body 4, and the electrode 511 is provided at the tooth root of the tooth-shaped structure 51 of the second ring-shaped body 5. In the case that the tooth-shaped structure of the first ring-shaped body 4 and the tooth-shaped structure of the second ring-shaped body 5 is meshed with each other, the electrode 411 provided at the tooth tip of the tooth-shaped structure of the first ring-shaped body 4 and the electrode 511 provided at the tooth root of the tooth-shaped structure of the second ring-shaped body 5 can be electrically connected to each other.

For example, the projection devices of the first ring-shaped body and the second ring-shaped body can be simultaneously powered through the two electrodes by a battery; or the first ring-shaped body 4 and the second ring-shaped body 5 are respectively provided with a battery; or the first ring-shaped body 4 and the second ring-shaped body 5 are respectively equipped with a wireless charging device, which can obtain the electrical energy through wireless charging.

According to one embodiment of the present disclosure, the wearable projection equipment can further comprise a touch detection module which can detect a touch action of a finger on an object as a projection screen. This touch detection module and the projection device can cooperate to realize the virtual touch control on the object as the projection screen.

Figure 5:
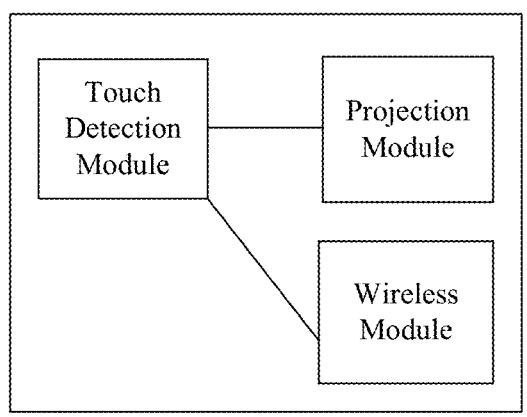
FIG. 5 is a module schematic diagram according to an embodiment of the present disclosure.

As an example, FIG. 5 schematically illustrates a schematic module diagram of either of ring-shaped bodies. As seen in FIG. 5, the touch detection module can be connected to the projection device so as to cooperate to realize the virtual touch control on the object as the projection screen.

According to one embodiment of the present disclosure, the touch detection module can comprise a laser generator and a laser detector, wherein the laser generator generates a laser projected on a surface of the object as the projection screen, and when a finger or a touch pen performs a pressing-key operation on the surface of the object as the projection screen having a keyboard pattern, the laser would form a spot on the finger or the touch pen, and the laser detector detects the mapping position on the keyboard pattern corresponding to the spot on the finger or the touch pen. The laser generator and the laser detector can be provided on one or two of the first ring-shaped body and the second ring-shaped body. The laser generator, the laser detector and either of the projection devices can constitute a virtual keyboard projecting device, for example, the projection device projects a keyboard pattern on the palm, the laser generator generates a laser projected on a surface of the palm, such as visible light or infrared light, and when a finger or a touch pen performs a pressing-key operation on the palm having a keyboard pattern, the laser will form a spot on the finger or the touch pen, and the laser detector detects the mapping position on the keyboard pattern corresponding to the spot on the finger or the touch pen, then which buttons have been pressed will be determined, so as to realize the virtual keyboard projection. For example, the touch detection module comprises a laser generator and a laser detector, wherein the laser generator is configured to generate a laser projected on a surface of the object as the projection screen, and the laser detector is configured to determine a touch position of a finger or a touch pen through a spot formed by the laser on the finger or the touch pen performing an operation on the projection screen.

For example, the wearable projection equipment can further comprise a wireless module which is electrically connected to the projection device on the first ring-shaped body and the projection device on the second ring-shaped body respectively, and the communication and/or electrical connection of the projection device with other equipments can be achieved by a wireless technology. For example, the wireless module can be provided on the first ring-shaped body, wherein the wireless module is connected to electrode at the tooth tip of the tooth-shaped structure of the first ring-shaped body and the projection device on the first ring-shaped body, the electrode at the tooth root of the tooth-shaped structure of the second ring-shaped body is connected to the projection device on the second ring-shaped body, so that the wireless module is electrically connected to the projection device on the second ring-shaped body through the two electrodes. Of course, the wireless module can also be provided on the second ring-shaped body, similarly the wireless module is electrically connected to the projection device on the first ring-shaped body through the electrodes at the tooth-shaped structures. The projection ring provided with the wireless module can be communicated with or electrically connected to the projection device and other equipments through a wireless technology, for example, the image on the phone screen is output directly onto the palm and/or the wall. The wireless module can also be electrically connected to the laser generator and the laser detector, for example, the output of the image on the phone screen and the key input are realized on the palm. Of course, the projection device can be connected to other equipments by means of a wired connection.

For example, FIG. 5 schematically illustrates a schematic module diagram of either of ring-shaped bodies. As can be seen in FIG. 5, the projection device can be connected to other equipments through the connection between the wireless module and the projection device. The wireless module can also be connected to the touch detection module so as to make the touch detection module communicated with other modules or equipments, or the like.

The wearable projection equipment in the present embodiment is capable of projecting images in different directions by providing the projection device respectively on the two rotatable structure bodies, such that application scenarios of the wearable projection equipment become more extensive, thereby making it more convenient to use. In addition, by introducing the laser generator and the laser detector to realize the projection of the virtual keyboard, the output of image and the key input can be achieved simultaneously. In addition, the connection with external equipments is achieved through the wireless module, so as to make the wearable projection equipment more convenient to use.

Although the projection ring is described as an example in the above, however, those skilled in the art will appreciate that the wearable projection equipment according to embodiments of the present disclosure is not limited thereto, for example, it can also be other equipments, such as a projecting bracelet, a projecting watch, a pair of projecting glasses or the like.

What are described above is related to the illustrative embodiments of the disclosure only and not limitative to the scope of the disclosure; the scopes of the disclosure are defined by the accompanying claims.

This disclosure claims the benefit of Chinese patent application No. 201420212879.1, filed Apr. 28, 2014, the disclosure of which is hereby incorporated herein by reference in its entirety.

The invention claimed is:

1. A wearable projection equipment, comprising:
a first structure body and a second structure body which are movably connected to each other and are configured to be rotatable relative to each other, the first structure body being a first ring-shaped body, and the second structure body being a second ring-shaped body;
an end opening of the first ring-shaped body and an end opening of the second ring-shaped body connected to each other in a telescope manner;
tooth-shaped structures meshing with each other are respectively provided at the two end openings where the first ring-shaped body and the second ring-shaped body connected to each other;
wherein a projection device is respectively provided on the first structure body and the second structure body; and
wherein an electrode is provided at a tooth tip of the tooth-shaped structure of the first ring-shaped body, and an electrode is provided at a tooth root of the tooth-shaped structure of the second ring-shaped body.

2. The wearable projection equipment of claim 1, wherein the wearable projection equipment is a projection ring.

3. The wearable projection equipment of claim 1, wherein the electrode provided at the tooth tip of the tooth-shaped structure of the first ring-shaped body and the electrode provided at the tooth root of the tooth-shaped structure of the second ring-shaped body are electrically connected to each other, where the tooth-shaped structure of the first ring-shaped body and the tooth-shaped structure of the second ring-shaped body meshing with each other.

4. The wearable projection equipment of claim 1, further comprising a touch detection module which is configured to detect a touch action of a finger or a touch pen on an object as a projection screen.

5. The wearable projection equipment of claim 4, wherein the touch detection module comprises a laser generator and a laser detector, wherein the laser generator is configured to generate a laser projected on a surface of the object as the projection screen, and the laser forms a spot on the finger or the touch pen, and the laser detector detects a mapping position on the keyboard pattern corresponding to the spot on the finger or the touch pen upon a finger or a touch pen performs a pressing-key operation on the surface of the object as the projection screen having a keyboard pattern.

6. The wearable projection equipment of claim 4, wherein the touch detection module is provided on at least one of the first structure and the second structure.

7. The wearable projection equipment of claim 4, wherein the touch detection module comprises a laser generator and a laser detector, wherein the laser generator is configured to generate a laser projected on a surface of the object as the projection screen, and the laser detector is configured to determine a touch position of a finger or a touch pen through a spot formed by the laser on the finger or the touch pen performing an operation on the projection screen.

8. The wearable projection equipment of claim 1, further comprising:
   a wireless module which is electrically connected to the projection devices on the first ring-shaped body and the second ring-shaped body respectively, and is used to achieve the communication and/or electrical connection between the projection device and other equipments.

9. The wearable projection equipment of claim 2, further comprising a touch detection module which is configured to detect a touch action of a finger or a touch pen on an object as a projection screen.

* * * * *